United States Patent [19]
Prissette et al.

[11] Patent Number: 5,658,676
[45] Date of Patent: Aug. 19, 1997

[54] COMPOSITE POLYESTER/PVA BARRIER FILMS

[75] Inventors: Michel Prissette, Bron; Didier Veyrat, St-Cyr Au-Mont-d'or, both of France

[73] Assignee: Rhone-Poulenc Films, Miribel, France

[21] Appl. No.: 414,382

[22] Filed: Mar. 31, 1995

[30] Foreign Application Priority Data

Mar. 31, 1994 [FR] France ................... 94 04267

[51] Int. Cl.$^6$ ............ B32B 27/36; B32B 27/08; D06N 7/04
[52] U.S. Cl. ............ 428/483; 428/141; 428/142; 428/215; 428/216; 428/480
[58] Field of Search ............ 428/35.4, 36.6, 428/36.7, 141, 142, 213, 216, 215, 480, 483

[56] References Cited

FOREIGN PATENT DOCUMENTS

| | | |
|---|---|---|
| 0135451 | 3/1985 | European Pat. Off. . |
| 0410903 | 1/1991 | European Pat. Off. . |
| 2273642 | 1/1976 | France . |

OTHER PUBLICATIONS

Database WPI, Week 8712, Derwent Publications Ltd., London, GB; AN 87-082327 & JP-A-62 032 048.

Database WPI, Week 8939, Derwent Publications Ltd., London, GB; AN 89-283002 & JP-A-1,208,132.

Database WPI, Week 8750, Derwent Publications Ltd., London, GB; AN 87-351332 & JP-A-62 253 435.

*Primary Examiner*—Peter A. Szekely
*Attorney, Agent, or Firm*—Burns, Doane, Swecker & Mathis, L.L.P.

[57] ABSTRACT

Polyester-based, biaxially oriented composite films having good transparency and gas-barrier properties, exhibiting excellent resistance to mechanical shock and being easily recyclable, comprise a polyester base film (for example shaped from polyethylene terephthalate) 5 µm to 50 µm in thickness, coated on at least one of its two face surfaces with a layer of polyvinyl alcohol having a number-average degree of polymerization equal to or greater than 350 and a thickness less than or equal to 0.3 µm, the mean roughness Rz of the base film being less than or equal to 0.30 µm on the at least one face surface of the film onto which a polyvinyl alcohol layer is coated and said at least one coated face surface comprising, on average, not more than 20 peaks of a height equal to or greater than 1 micrometer and not more than 150 peaks of a height ranging from 0.4 to 1 micrometer, per square millimeter, and such composite films exhibiting a permeability to oxygen, measured at 23° C. at 50% relative humidity, less than or equal to 3 $cm^3/m^2/24$ h.

16 Claims, No Drawings

COMPOSITE POLYESTER/PVA BARRIER FILMS

BACKGROUND OF THE INVENTION

1. Field of the Invention

The present invention relates to polyester-based composite films having good gas-barrier properties, and, more especially, to polyester/PVA such barrier films.

2. Description of the Prior Art

Polyester films, especially of polyethylene terephthalete, are today widely employed in the packaging industry, because of their many advantages such as their mechanical properties, their transparency, their nontoxicity, their odorlessness and their tastelessness.

However, their gas-barrier properties may limit their use in applications requiring a high protection of the packaged products against the action of external gases, in particular against the action of atmospheric oxygen or, conversely, may not allow the gas composition inside the packages to be maintained constant.

In order to overcome this disadvantage, GB-A-1,126,952 describes the deposition of a solution of polyvinyl alcohol ("PVA") onto a polymer film to create a polyvinyl alcohol layer, since this latter polymer has good gas-barrier properties. To provide good adhesion of the polyvinyl alcohol layer to films of cellulose acetate, polycarbonate or polyethylene terephthalete, an intermediate layer of an adhesive made of polyurethane is deposited between the base film and the polyvinyl alcohol layer.

EP-A-0,254,468 also describes a composite film comprising a base film of a synthetic thermoplastic polymer such as a polyamide, polyethylene, polypropylene or polyester, having two coatings on the same single face surface to the base film; the first coating is adjacent to the base film and comprises a urethane primer in a solvent, which in the dry state permits a dispersion of polyvinyl alcohol in aqueous solution to wet the primer, and the second coating is deposited over the dried and free face surface of the first coating and includes a polyvinyl alcohol-based material employed as a gas barrier.

In the composite films of the prior art the polyvinyl alcohol coating is typically separated from the base film by an adhesive layer comprising a polyurethane. Moreover, the polyvinyl alcohol layer is generally thick (for example ranging from 0.15 to 2 micrometers, per the claims of the aforesaid EP-A-0,254,468), and this complicates the recyclability of the composite films.

SUMMARY OF THE INVENTION

Accordingly, a major object of the present invention is the provision of improved polyester films having good gas-barrier properties provided by a polyvinyl alcohol coating or layer deposited directly onto at least one face surface of the polyester film in the absence of any intermediate adhesive layer.

Briefly, the present invention features a polyester-based, biaxially drawn or oriented composite film having improved gas-barrier properties, comprising a polyester base film 5 μm to 50 μm in thickness, coated on at least one of its two face surfaces with a layer of polyvinyl alcohol which has a number-average degree of polymerization equal to or greater than 350, having a thickness less than or equal to 0.3 μm, the mean roughness Rz of the base film being less than or equal to 0.30 μm on the face surface(s) of the film comprising the polyvinyl alcohol layer and that or these face surface(s) comprising, on average, not more than 20 peaks of a height equal to or greater than 1 micrometer and not more than 150 peaks of a height ranging from 0.4 to 1 micrometer, per square millimeter, and said composite film exhibiting a permeability to oxygen, measured at 23° C. at 50% relative humidity, less than or equal to 3 $cm^3/m^2/24$ h.

DETAILED DESCRIPTION OF BEST MODE AND PREFERRED EMBODIMENTS OF THE INVENTION

More particularly according to the present invention, the peak height distribution referred to above to define the surface topography of the polyester base film may be determined in known manner, by observation in an interferometric microscope permitting the number of interference rings with a light of known wavelength to be counted. The most typically employed interferometers are the Nomarski or Mirau or Michelson interferometers.

The polyester comprising the base film may be selected from among polyesters which are typically employed for the preparation of biaxially oriented semicrystalline films. These are film-forming linear polyesters capable of being crystallized by orientation and usually prepared from one or more aromatic dicarboxylic acids or derivatives thereof (for example esters of lower aliphatic alcohols or halides) and from one or more aliphatic glycols. Phthalic, terephthalic, isophthalic, 2,5-naphthalenedicarboxylic and 2,6-naphthalenedicarboxylic acids are exemplary of such aromatic acids. These acids may be used in combination with a minor amount of one or more aliphatic or cycloaliphatic dicarboxylic acids such as adipic, azelaic or hexahydroterephathalic acids.

Ethylene glycol, 1,3-propanediol and 1,4-butanediol are exemplary of such aliphatic diols. These diols may be used in combination with a minor amount of one or more aliphatic diols of higher carbon content (for example neopentyl glycol) or cycloaliphatic such diols (cyclohexanedimethanol).

The crystallizable film-forming polyesters are preferably alkylenediol polyterephthalates or polynapthalenedicarboxylates and, in particular, the polyterephthalate of ethylene glycol (PET) or of 1,4-butanediol, or copolyesters containing at least 80 mol % of ethylene glycol terephthalate recurring structural units. The polyester is advantageously a polyethylene terephthalate whose intrinsic viscosity measured at 25° C. in ortho-chlorophenol ranges from 0.6 to 0.75 dl/g.

The polyester comprising the base film must be selected such that its initial melting temperature is higher than the temperature to which the biaxially drawn film comprising the polyvinyl alcohol layer is heated during its preparation.

The mean roughness Rz of the base film (as defined in DIN Standard 4768) is less than or equal to 0.30 μm and preferably less than 0.25 μm on the face surface of the film onto which the polyvinyl alcohol layer is deposited.

It is preferable that, on average, this face surface should not comprise more than 800 peaks of a height less than 0.4 micrometer, per square millimeter.

For industrial applications of the processes for the preparation of the films of the invention, in which the machine speed to which the film is subjected is generally greater than 100 meters per minute, it is more particularly preferred that the face surface of the base film onto which the polyvinyl alcohol layer is deposited should on average not comprise more than 20 peaks of a height equal to or greater than 1 micrometer and not more than 100 peaks of a height of from 0.4 to 1 micrometer, per square millimeter. Finally, even more preferably on an industrial scale, the face surface of the base film onto which the polyvinyl alcohol layer is deposited should not on average comprise more than 500 peaks of a height less than 0.4 micrometer, per square millimeter. It will be appreciated, however, that when operating at lower speeds, especially in tests on a pilot plant or laboratory scale, this preferred embodiment is not necessary.

The other face surface, designated the back face surface, should have sufficient slip properties to permit easy handling of the film, especially its winding over the various guide rolls during drawing operations, or its reeling onto itself.

This surface roughness may be provided via a variety of techniques. One of the most common procedures entails incorporating inert solid fillers into the polyester before its conversion into film. These fillers are typically inorganic filler materials such as, for example, silica, titanium dioxide, zirconium dioxide, alumina, silica/alumina mixtures, silicates, calcium carbonate and barium sulfate. These fillers may also be polymer particles.

The volume-median diameter of the fillers generally ranges from 1 to 10 micrometers and preferably from 1 to 5 micrometers.

The filler content of the film usually ranges from 0.02% to 1% by weight relative to the weight of the polyester.

One advantageous embodiment of the invention comprises having different mean roughnesses Rz on the two face surfaces of the base polyester film, for example one equal to or greater than 0.15 micrometer on the back face surface of the film and one less than or equal to 0.30 micrometer, and preferably less than or equal to 0.25 micrometer, on the face surface of the base film comprising the polyvinyl alcohol coating. Said face surface of the base film which has the polyvinyl alcohol coating preferably comprising, on average, not more than 20 peaks of a height equal to or greater than 1 micrometer and not more than 100 peaks of a height ranging from 0.4 to 1 micrometer, per square millimeter and, still more preferably, not more than 500 peaks of a height less than 0.4 micrometer, per square millimeter.

The polyester base film may thus include two layers exhibiting different surface properties, especially roughnesses.

The production of such asymmetrical films may be carried out by coextrusion of two polyesters comprising different filler contents and, if appropriate, different fillers. The polyester employed is conveniently the same for the two coextruded layers and the layer onto which the polyvinyl alcohol layer is deposited is not filled. The relative thicknesses of the two polyester layers comprising the base polyester film may vary widely.

The unfilled (or less highly filled) layer onto which the polyvinyl alcohol is deposited generally has a thickness greater than or equal to 0.5 µm, preferably greater than or equal to 1.0 µm.

It is also within the scope of the invention to provide a polyester base film exhibiting different surface properties on both face surfaces, employing other means known to this art.

It is thus possible, as described in EP-A-0,378,954, to impart a good slip to the back face surface of the base film by depositing onto said back face surface a modified polymer obtained by aqueous phase radical polymerization of at least one acrylic monomer and of a water-dispersible polyester derived from at least one aromatic dicarboxylic acid and from at least one aliphatic diol and comprising a plurality of sulfonyloxy groups, especially sodium sulfonate.

As indicated above, the polyvinyl alcohol layer has a thickness equal to or greater than 0.3 µm. If desired, this thickness may be less than or equal to 0.20 µm or even less than 0.10 µm, in order to further improve the recyclability of the film according to the invention. In practice, it is rare to utilize thicknesses less than 0.05 µm.

The present invention also features composite films such as those described above, which additionally comprise on one of their face surfaces a printing or a printing primer layer, or else a heat-sealable layer on the face surface devoid of the polyvinyl alcohol layer.

The printing layer may be deposited by known printing methods such as, for example, photogravure, flexography or silkscreen printing. Inks in nonaqueous solution or dispersion will preferably be employed.

The heat-sealable layer is preferably of polyolefin type (especially polyethylenes, polypropylenes and ethylene/vinyl acetate polymers). These composite films may be prepared by adhesive backing with the aid of single- or two-component adhesive, or by extrusion coating. In this latter instance, the face surface devoid of the polyvinyl alcohol layer is precoated in known manner with a bonding primer.

The composite films thus produced may be used for the manufacture of packaging such as sachets, small tub closures, overwraps and the like, intended to contain oxidation-sensitive products. They are very particularly well suited for packaging under modified atmosphere.

As indicated above, one of the advantages of film of this type is that it can be easily recycled, by virtue of the reduced thickness of the polyvinyl alcohol layer.

The present invention also features a process for the preparation of the films described above.

More precisely, it features a process for the preparation of composite films based on a polyester film having on at least one of its face surfaces a layer of polyvinyl alcohol of a thickness less than or equal to 0.3 micrometer, wherein the polyester base film is coated on at least one of its face surfaces which has a mean roughness Rz less than or equal to 0.30 µm and on average comprises not more than 20 peaks of a height equal to or greater than 1 micrometer and to not more than 150 peaks of a height from 0.4 to 1 micrometer, per square millimeter, using an aqueous solution of polyvinyl alcohol exhibiting at least 95% of vinyl alcohol recurring structural units, said polyvinyl alcohol exhibiting, in aqueous solution at a concentration of 4% and at 120° C., a viscosity equal to or greater than 4 mPa.s, and further wherein the coated film is heat-treated at a temperature equal to or greater than 170° C.

It is preferable that the face surface of the polyester film onto which the polyvinyl alcohol is coated additionally does not comprise, on average, more than 800 peaks of a height less than 0.4 micrometer, per square millimeter.

Also as indicated above, in an industrial scale application of the process according to the present invention at a high machine speed (generally more than 100 meters per minute), it is advantageous that the coating with the aqueous solution of polyvinyl alcohol be carried out on at least one face surface of a polyester film on average comprising not more than 20 peaks of a height equal to or greater than 1 micrometer and not more than 100 peaks of a height ranging from 0.4 to 1 micrometer, per square millimeter.

Lastly, also in respect of an industrial scale application, it is even more particularly preferred that the coating with the aqueous solution of polyvinyl alcohol be carried out on at least one face surface of a polyester film additionally comprising, on average, not more than 500 peaks of a height less than 0.4 micrometer, per square millimeter.

The coating of the polyester base film with a solution of polyvinyl alcohol may be carried out in-line, or by reprocessing. In-line coating is preferably employed.

Even more preferably, the coating will be carried out in-line onto a monoaxially drawn polyester base film which again will be drawn, after coating, at least in the direction opposite to that of the first drawing.

Before the coating of the base film the surface of the latter is generally subjected to a physical treatment (such as, for example, corona, flame or plasma) intended to ensure a good spreading of the polyvinyl alcohol layer over and onto the base film. This treatment permits the surface tension of the monoaxially drawn film to be adjusted to a value that is preferably greater than that of the polyvinyl alcohol coating and preferably to a value equal or greater than 54 mN m.

The aqueous solution of polyvinyl alcohol which is used generally has a concentration of 1% to 20% by weight per weight and preferably from 5% to 15% by weight per weight. The solution is carefully prepared, first cold with simple stirring and then by heating to a temperature not exceeding 95° C.; it is filtered after cooling. This solution must be free from gels. The absence of gels may be determined by measuring turbidity, solids content and refracture index.

The polyvinyl alcohol according to the present invention is a commercially available polymer. It may be employed as is, or may be prepared, especially, by hydrolysis of vinyl carboxylates, more particularly polyvinyl acetates or copolymers thereof which are rich in vinyl acetate recurring structural units, such as vinyl acetate/ethylene (or EVA) copolymers. As indicated above, the polyvinyl alcohol employed comprises at least 95% of vinyl alcohol units (degree of hydrolysis of at least 95%). It preferably comprises at least 97% thereof and still more preferably at least 98%.

The polyvinyl alcohol comprising the coating of the composite film of the invention preferably has a viscosity in aqueous solution at a concentration of 4% and at 20° C., measured in an apparatus of Brookfield type, which is equal to or greater than 4 centipoises (or 4 mPa.s), which corresponds, within the experimental errors associated with the measurements, to a number-average degree of polymerization equal to or greater than 350.

The selection of the concentration of polyvinyl alcohol in the solution and of the apparatus used for the coating is determined especially by the desired thickness of the final polyvinyl alcohol layer.

Without intending to be limited to this particular embodiment, the in-line coating is advantageously carried out with the aid of rolls which are photoengraved according to the so-called "reverse gravure" technique.

While also not limiting, the polyester base film is in most instances drawn or oriented lengthwise (namely, in the machine direction) prior to the in-line coating using the aqueous polyvinyl alcohol solution.

This drawing (stretching) may be carried out in one or more stages, as also can the drawing following the in-line coating.

The temperature at which the coated film is treated preferably ranges from 180° C. to 240° C. and more preferably from 200° C. to 230° C.

The polyester base may be prepared by extrusion of a polyester as described above, comprising one or a number of inert fillers, in particular to impart a sufficient slip thereto. It may also be prepared by coextrusion, on the one hand, of an unfilled or more slightly filled polyester and, on the other, of a filled polyester.

In this second alternative embodiment the polyester base film comprises a rough filled layer defining the so-called back face and an unfilled, or more slightly filled, layer defining the so-called front face which will receive the coating of the polyvinyl alcohol solution.

The filled polyester layer typically has a mean roughness Rz which is greater than or equal to 0.15 micrometer and preferably greater than or equal to 0.30 micrometer, whereas the unfilled or more slightly filled front layer has a total roughness less than or equal to 0.30 micrometer and preferably less than or equal to 0.25 micrometer. As indicated above, the face surface of the base film onto which the coating of the polyvinyl alcohol solution will be applied does not comprise, on average, more than 20 peaks of a height equal to or greater than 1 micrometer and not more than 100 peaks of a height of from 0.4 to 1 micrometer, per square millimeter, and even more preferably not more than 500 peaks of a height lower than 0.4 micrometer, per square millimeter.

The composite films of the invention have an excellent resistance to mechanical forces such as, in particular, creasing. This reflects that their barrier properties described above are not, or not significantly, decreased or degraded after such a mechanical shock.

In order to further illustrate the present invention and the advantages thereof, the following specific examples are given, it being understood that same are intended only as illustrative and in nowise limitative.

EXAMPLES

General Procedure

A composite film of polyethylene terephthalate (PET) was prepared by coextrusion, on the one hand, of a PET containing 0.0800% of silica obtained by precipitation of gels and exhibiting a mean diameter of 3.3 micrometers (measurement using a laser particle size analyzer marketed under the trademark Sympatec and of Hélos type), which formed the base film and, on the other, of an unfilled PET whose external face surface received the polyvinyl alcohol (PVA) coating.

The polyester film had a thickness of 12 micrometers in the various examples or comparative tests, unless indicated otherwise, and a mean roughness Rz of 0.45 micrometer on the back face surface. It included an unfilled layer (receiving the PVA coating) which had a thickness of 0.5 to 2.0 micrometers according to the examples, in order to vary the distribution of peak heights per square millimeter of the surface intended to receive the PVA coating.

The coextruded film was first drawn or oriented lengthwise with a draw ratio of 3.4; it was then subjected to a corona treatment which adjusted its surface tension to 58 mN m.

The face surface of the film comprising the unfilled layer was then coated using a photogravure coating system with an engraved roll. The machine speed during the coating was 200 m/min. The coating was carried out using an aqueous PVA solution at a concentration of 10%, carefully prepared and free from gels. Unless indicated otherwise, the PVA employed contained 98–99% of vinyl alcohol recurring units and had a viscosity of 5.5 mPa.s (measured at 20° C. on an aqueous solution at a concentration of 4% using a Brookfield LV viscometer).

The coated film was then subjected to a transverse drawing with a ratio of 4 and was then heat-treated at a temperature of 230° C. (unless indicated otherwise). The thickness of the PVA layer of the biaxially drawn film was 0.10 micrometer (unless indicated otherwise).

Examples 1 to 3 and Comparative Tests a, b and c

These various tests were carried out using composite films, the face surfaces of which that received the PVA coatings exhibited different peak height distributions. Test a was carried out without PVA coating. Permeability to oxygen was measured at 23° C. at 50% relative humidity for each of the films; it is expressed in $cm^3/m^2/24$ h (measurements carried out using an apparatus of Oxtran trademark, type 300H, marketed by Modern Control Inc.).

Table 1 below reports the peak height distributions per square millimeter and the mean roughness of the film face surface receiving the PVA coating, and the values of permeability to oxygen.

TABLE 1

| Examples | Rz | Number of peaks of height | | | Permeability to oxygen |
|---|---|---|---|---|---|
| | | >1 μm | between 0.4 and 1 μm | <0.4 μm | |
| Example 1 | 0.2 | 4 | 12 | 170 | 1 |
| Example 2 | 0.3 | 13 | 65 | 160 | 2 |
| Example 3 | 0.3 | 13 | 60 | 324 | 2 |
| Test a | 0.2 | 4 | 12 | 170 | 110 |
| Test b | 0.45 | 29 | 110 | 1,000 | 5 |
| Test c | 0.5 | 32 | 325 | 1,630 | 10 |

Example 4 and Comparative Test d

The procedure of Example 1 was repeated, but the heat-treatment of the PET film was carried out at a different temperature.

Table 2 below reports the measured permeabilities to oxygen, according to the treatment temperature adopted (Example 1 was repeated for purposes of comparison).

TABLE 2

| Examples | Treatment temperature | Permeability to oxygen |
|---|---|---|
| Example 4 | 180° C. | 1.3 |
| Example 1 | 230° C. | 1 |
| Test d | 150° C. | 5 |

Comparative Tests e and f

These tests were carried out using the same film as in Example 1, but the coating was a polyvinyl alcohol which had a percentage of vinyl alcohol recurring units (or degree of hydrolysis) less than 95%. The permeability obtained with the films thus prepared is reported in Table 3 below (Example 1 was repeated for purposes of comparison).

TABLE 3

| Examples | Degree of hydrolysis of PVA | Permeability to oxygen |
|---|---|---|
| Test e | 86.5–89.5 | 32 |
| Test f | 78–81 | 85 |
| Example 1 | 98–99 | 1 |

Example 5 and Comparative Test g

These tests were carried out using the same film as in Example 1, but the coating was a polyvinyl alcohol which had a viscosity (measured at 20° C. in an aqueous solution at a concentration of 4% with the aid of a Brookfield LV viscometer) other than 5.5 mPa.s (the corresponding number-average degree of polymerization DPn, provided by the producer of the PVA, is also recorded). The permeability obtained with the films thus prepared is reported in Table 4 below (Example 1 was repeated for purposes of comparison).

TABLE 4

| Examples | Viscosity in mPa · s | DPn | Permeability to oxygen |
|---|---|---|---|
| Example 5 | 4.5 | 400 | 2 |
| Test g | 3.5 | 300 | 8 |
| Example 1 | 5.5 | 500 | 1 |

Example 6

The procedure of Example 1 was repeated, the film having a total thickness of 40 μm and an unfilled layer receiving the polyvinyl alcohol coating having a thickness of 2 μm.

The permeability to oxygen of the film coated with an 0.1 μm layer was 1.5 $cm^3/m^2/24$ h.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A polyester-based, biaxially oriented composite film having good gas-barrier properties, comprising a polyester base film 5 μm to 50 μm in thickness, coated on at least one on its two face surfaces with a layer of polyvinyl alcohol having a number-average degree of polymerization equal to or greater than 350 and a thickness less than or equal to 0.3 μm, the mean roughness Rz of the base film being less than or equal to 0.30 μm on the at least one face surface of the film onto which a polyvinyl alcohol layer is coated and said at least one coated face surface comprising, on average, not more than 20 peaks of a height equal to or greater than 1 micrometer and not more than 150 peaks of a height ranging from 0.4 to 1 micrometer, per square millimeter, and said composite film exhibiting a permeability to oxygen, measured at 23° C. at 50% relative humidity, less than or equal to 3 $cm^3/m^2/24$ h.

2. The composite polyester film as defined by claim 1, said polyester base film comprising an alkylenediol polyterephthalate or polynapthalenedicarboxylate.

3. The composite polyester film as defined by claim 2, said polyester base film comprising an ethylene glycol or 1,4-butanediol polyterephthalate, or a copolyester comprising at least 80 mol % of ethylene glycol terephthalate recurring structural units.

4. The composite polyester film as defined by claim 1, said at least one face surface of the film onto which a polyvinyl alcohol layer is coated comprising, on average, not more than 800 peaks of a height less than 0.4 micrometer, per square millimeter.

5. The composite polyester film as defined by claim 1, said at least one face surface of the film onto which a polyvinyl alcohol layer is coated comprising, on average, not more than 20 peaks of a height equal to or greater than 1 micrometer and not more than 100 peaks of a height ranging from 0.4 to 1 micrometer, per square millimeter.

6. The composite polyester film as defined by claim 1, said at least one face surface of the film onto which a polyvinyl alcohol layer is coated comprising, on average, not more than 500 peaks of a height less than 0.4 micrometer, per square millimeter.

7. The composite polyester film as defined by claim 1, the two face surfaces of said polyester base film having different mean roughnesses Rz.

8. The composite polyester film as defined by claim 7, comprising an uncoated back face surface having a mean roughnesses Rz of at least 0.15 micrometer and a polyvinyl alcohol coated front face surface having a mean roughness Rz no greater than 0.30 micrometer.

9. The composite polyester film as defined by claim 8, said front face surface comprising, on average, not more than 20 peaks of a height of at least 1 micrometer and not more than 100 peaks of a height ranging from 0.4 to 1 micrometer, and not more than 500 peaks of a height less than 0.4 micrometer, per square millimeter thereof.

10. The composite polyester film as defined by claim 8, said polyester base film comprising at least two layers having different surface properties.

11. The composite polyester film as defined by claim 10, said polyester base film comprising a coextrudate.

12. The composite polyester film as defined by claim 11, said coextrudate comprising two polyester layers having different filler content or different filler materials.

13. The composite polyester film as defined by claim 12, wherein the layer onto which the polyvinyl alcohol is coated is either unfilled or is more slightly filled than the other layer, and has a thickness of at least 0.5 μm.

14. The composite polyester film as defined by claim 13, said coated layer having a thickness of at least 1.0 μm.

15. The composite polyester film as defined by claim 1, the at least one layer of polyvinyl alcohol having a thickness no greater than 0.20 μm.

16. The composite polyester film as defined by claim 8, said polyvinyl alcohol coating having a printing or printing primer layer deposited thereon, and said back face surface having a heat-sealable layer deposited thereon.

* * * * *